United States Patent [19]

Karagiannis

[11] Patent Number: 4,838,985
[45] Date of Patent: Jun. 13, 1989

[54] APPARATUS FOR COATING AND LAMINATING SHEET MATERIALS

[76] Inventor: Constantinos Karagiannis, Xenophontos Str. 139, Kalithea,

[21] Appl. No.: 47,176

[22] Filed: May 8, 1987

[30] Foreign Application Priority Data

Sep. 17, 1986 [GR] Greece ............... 86.2375/H

[51] Int. Cl.⁴ .................. B32B 31/04; B32B 31/18
[52] U.S. Cl. ............................ 156/522; 156/552; 156/570; 118/236; 118/239; 118/249
[58] Field of Search ........... 156/519, 522, 552, 390, 156/529, 551, 569, 570; 118/40, 41, 42, 236, 239, 249

[56] References Cited

U.S. PATENT DOCUMENTS

| | | | |
|---|---|---|---|
| 1,504,218 | 8/1924 | Crowell | 156/551 |
| 1,777,947 | 10/1930 | Valtat | 156/522 |
| 3,196,069 | 7/1965 | Froehlig | 156/552 |
| 3,257,226 | 6/1966 | Thwaites | 118/249 |
| 3,639,194 | 2/1972 | Plunkett et al. | 156/552 |
| 4,470,589 | 9/1984 | Singer | 156/552 |
| 4,505,772 | 3/1985 | Renz | 156/552 |
| 4,680,080 | 7/1987 | Instance | 156/552 |

Primary Examiner—Caleb Weston
Attorney, Agent, or Firm—Dowell & Dowell

[57] ABSTRACT

An apparatus for feeding, coating, varnishing, plasticizing, laminating and cutting sheet materials including those used in the manufacture of cartons and boxes wherein a positive guide or feed assembly is used to sequentially deliver varying sizes of sheet materials regardless of any openings therein to a conveyor system which passes the materials to a coating, gluing or plasticizing assembly which includes spaced cylinders wherein the material is selectively coated on one or both sides and after which the material may have a second sheet material laminated thereto. The invention further incorporates a cutter assembly for severing treated and laminated materials to preselected lengths.

13 Claims, 7 Drawing Sheets

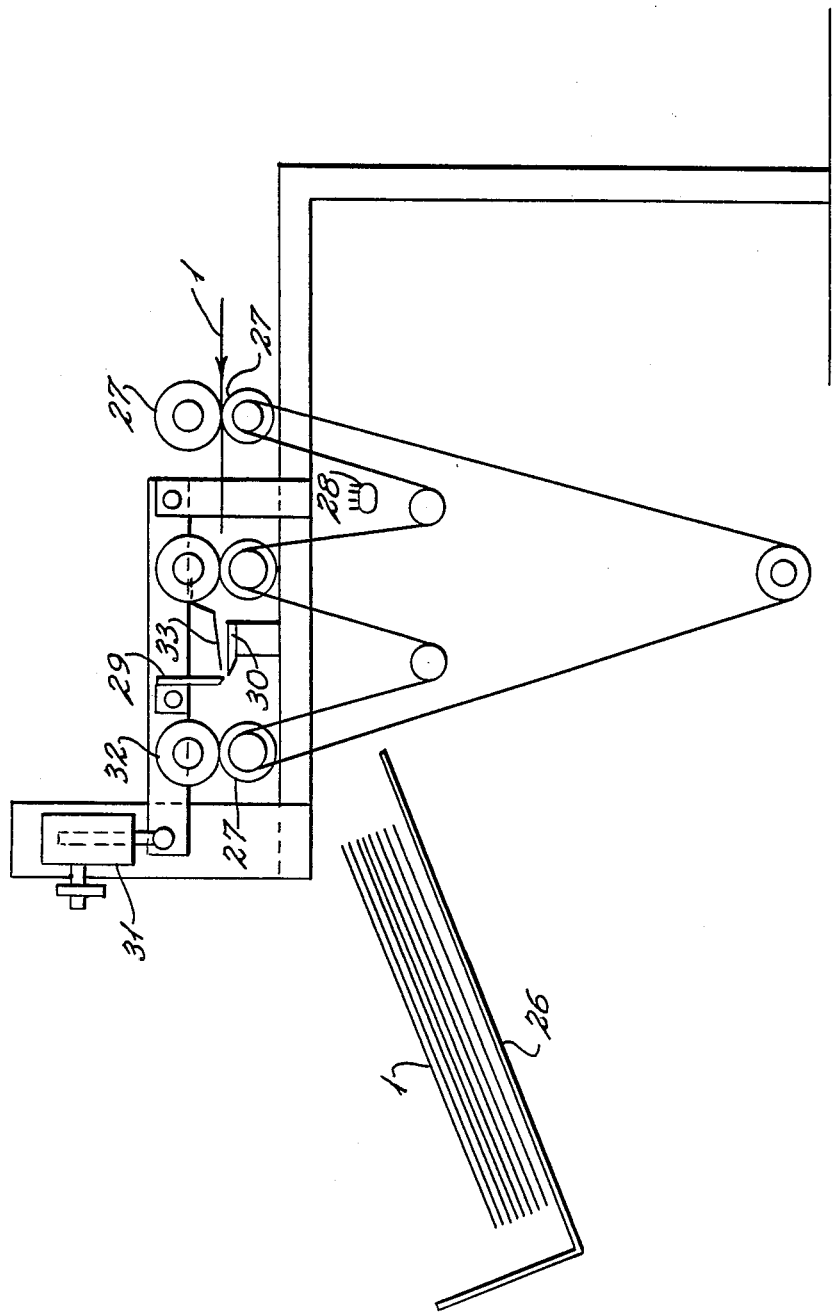

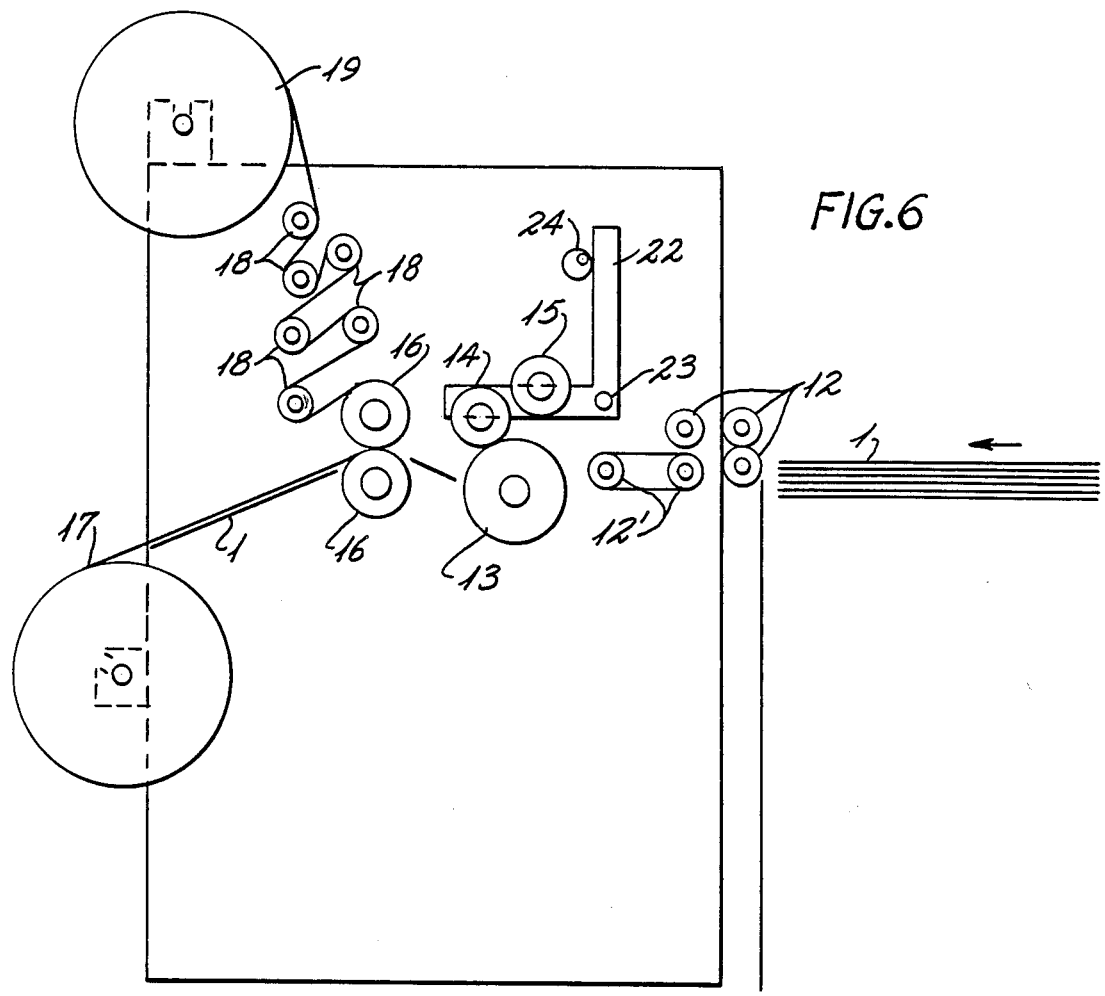
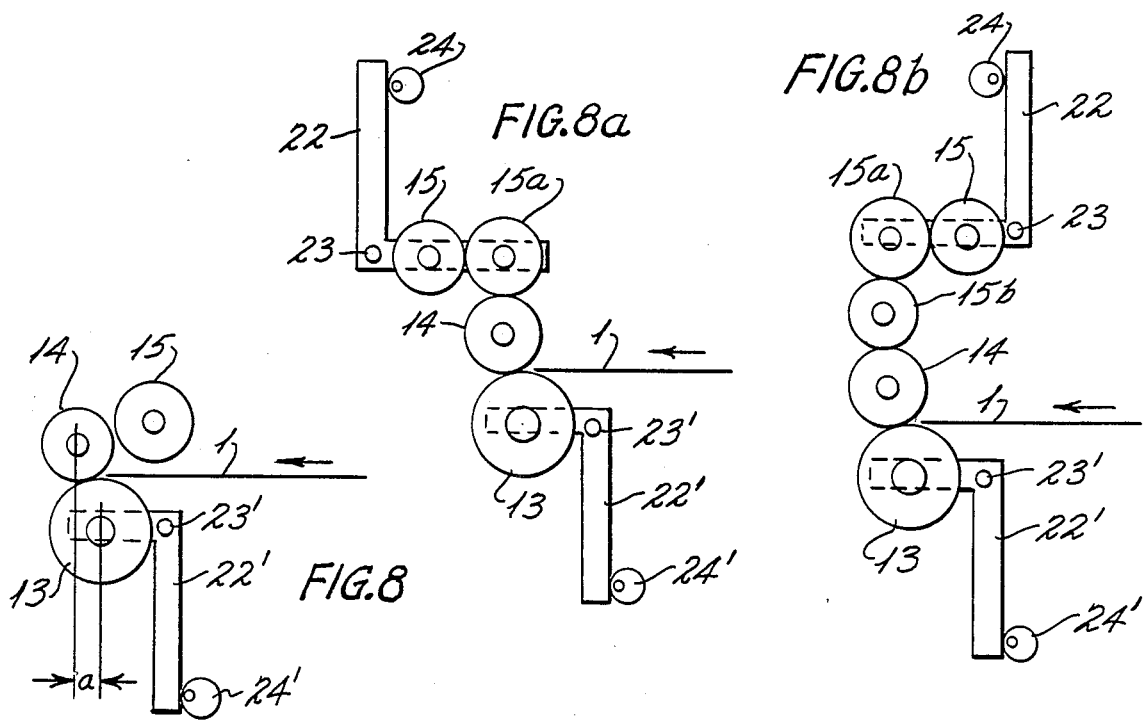

APPARATUS FOR COATING AND LAMINATING SHEET MATERIALS

BACKGROUND OF THE INVENTION

1. Field of the Invention

This invention is generally directed to machines for coating and laminating sheet materials and more specifically to an apparatus for positively feeding varying sizes of paper, cardboard or metallic sheet materials which may be imperforate or perforate to coating rollers wherein the material may be selectively coated on either or both sides so as to varnish, plasticize or glue the material and wherein the material may thereafter be laminated with a second material which may be in the form of a web of plastic which would cover any perforations or opening in the primary base material. The invention is further directed to the use of a coating machine which incorporates a cutter assembly which may be utilized to sever the treated and laminated materials to preselected lengths. The invention further incorporates the use of specially aligned and mounted applicator cylinders which insure that the varnish, glue or plasticizing agent does not contaminate the rollers or cylinders as the sheet material passes therebetween.

The present invention is directed to a device for coating and plasticizing sheet materials which may have openings or perforations and which may be paper, cardboard, carton, metal or plastic materials wherein the materials are fed by a simplified feeding head which prevents the sheet material from being misfed to the coating rollers or cylinders. The invention is further directed to improving the production of graphical materials and boxes utilizing plasticizing, polishing and varnishing agents which are applied to one or both sides of sheet material and which are applied in such a manner as to increase the production rate and decrease the overall production costs with respect to such manufacturing.

2. History of the Related Art

Heretofore, it has taken four or more devices to coat sheet materials utilized in various box or other manufacturing operations. Therefore, with the present invention, an improvement in operating costs and space savings is achieved which reduces the overall cost of carton and box manufacture. The invention is particularly directed to manufacturing cartons which may include openings or windows which are covered by a laminate or thin plastic material. Further, the present invention is easy to operate and may be utilized by relatively unskilled persons which is contrary to the prior art devices which require a great deal of personnel training.

The quality of the finished sheet materials of the present invention is excellent and the quantities of production can be increased over the prior art while still achieving a cost reduction in manufacturing. This is especially true with plasticized sheets which have glue applied thereto nd thereafter are immediately pressed against a transparent plastic laminate film and rolled tightly so as to reduce the amount of glue consumption utilized in the laminating process. Further, the present invention may be utilized with glues which are water soluble and odorless, inexpensive to purchase and fireproof so that the glues will not adversely effect the local environment and will reduce manufacturing costs normally associated with glues which utilize solvents which must be evaporated during the laminating process.

Prior to the present invention, manufacturing containers or boxes utilized sheet feeding systems which were extremely complicated and involved high production costs. Further, conventional feed systems for coating and laminating machines have frequently encountered problems resulting in misfeeding of the materials to the coating units resulting in loss of manufacturing time and materials. This is especially true with feeding mechanisms which are not designed to accommodate varying sizes of sheet material. In many instances, sheet materials will be misfed or introduced in an improper alignment with the coating cylinders or feed devices passing the materials to the coating cylinders thereby resulting in damage to the material in the manufacturing process. Also, many prior art feeding mechanisms were not adequately designed to feed sheet materials having openings or which were perforated such as materials which are utilized to manufacture boxes or cartons having packing windows incorporated therein. With many feed mechanisms, the individual sheets of material which are stacked near the feed assembly will bind with one another especially if openings are provided in the material for the creation of packing windows. As one sheet is moved relative to the stack, the edge defining the opening or perforation in the material has a tendency to engage portions of the underlying materials thereby misfeeding or misaligning the sheet as it is moved toward the coating assemblies. This misfeeding is further complicated when the sheet materials have become distorted or warped due to improper packaging or climatic conditions.

In addition, prior art coating machines conventionally use cylinders and revolving drums having teeth incorporated therewith for holding the sheet material as it passes adjacent to a coating cylinder. In many instances, material which is fed into the coating cylinders may stick with the drum or the teeth associated therewith as the drums and teeth become contaminated with glue or other materials being applied to the sheet material as it passes in relationship to the coating cylinders and pressure cylinder or drums. The problem of drum or cylinder contamination is further complicated in those instances where the pressure cylinder contacts and is in direct alignment with the coating cylinder so that coating materials are applied directly to the pressure cylinder surface in the absence of sheet material passing therebetween. This results in further contamination of the pressure cylinder and will result in the misaligning and misfeeding of the sheet materials passing between the pressure cylinder and the coating cylinder. In these instances, the cylinders must be cleaned in order to prevent fouling of sheet materials passing between the pressure and coating cylinders. This cleaning requires that the equipment be shut down for a period of time thereby reducing production. Further, if different sizes or shapes of sheet material are to be utilized, regulation and setting of the spacing between the drums or pressure cylinder and coating cylinders is often necessary. Such adjustment further reduces the downtime of the machine and therefore loss in production.

A further problem with prior art laminating type equipment utilized in coating and laminating machinery is that the material to be laminated is frequently coated with a material that must be heated to remove solvents or reduce the amount of moisture on the film material prior to its being pressed to the underlying base material. The heat needed for such operations increases costs and complicates the overall assembly in that shrinkage of the laminate film may occur especially with the use of glues containing solvents. Further, when watery glues are used, they are slow drying and tend not to stick together thereby not providing a satisfactory bond between the overlying film and the base material.

Another problem prevelant in prior art coating and laminating machines is that the coating, gluing, varnishing or other material being applied to the sheet material is not maintained in a uniform liquid phase thereby creating differences in application rates and bondings between various materials. As the machine is operated, the coating material may have a tendency to settle within the primary bowls which feed the coating cylinders thereby effecting the overall application rate and bonding characteristics of the coating material. Further, in many systems, there is no means provided for recycling the adhesive or coating materials and such materials are frequently not only wasted but also present problems in clogging or contaminating the interface between the application rollers and pressure cylinders which feed sheet material relative to the coating cylinders.

Another problem associated with prior art coating machinery which is utilized to sever generally continuous laminating films applied over separate base sheet materials is that the cutting mechanisms become fouled due to the application of glue or other coating materials along the continuous length of the laminate sheet even though the underlying layers are spaced relative to one another. If the cutter mechanism becomes fouled, then the overall operation and production rate is significantly reduced with the cleaning of the cutter mechanisms becoming necessary.

SUMMARY OF THE INVENTION

The present invention is primarily characterized in that it consists of a complete and independent device for feeding, coating and laminating sheet materials and which incorporates a special feed head which is made for feeding paper, carton material, metal, plastic sheets and the like, regardless of size and regardless of whether or not the sheets have openings therein. The feeding device may incorporate special guides which extend through openings in the sheet material and which prevent the sheet materials from binding relative to one another as they are lifted from a vertically arrayed stack of materials and fed to a conveyor system for introducing the materials to coating cylinders.

The present invention is further characterized in that the apparatus may be utilized to either coat one or both sides of the sheet material as the material is passed between pressure drums and coating rollers or cylinders. Further, in the preferred embodiment, the coating cylinders are offset with respect to the vertical plane of the pressure cylinders so that the drums are protected from becoming fouled with coating materials which may be glues, varnishes, plasticizing agents and the like. Further, the coating cylinders or rollers are mounted on floating frames which permit the rollers to apply uniform pressure to the sheet materials regardless of the size of the material passing between the coating rollers and the pressure cylinders.

The present invention is further characterized by providing a laminating assembly whereby a thin laminating plastic material may be applied over the base sheet material in such a manner as to cover any openings therein and wherein the laminating or covering material is applied utilizing a uniform glue coating that is immediately pressed to the underlying or base material.

The invention is further characterized by providing a special cutter assembly which incorporates knives for severing the laminated materials from each other without being contaminated by the glue coating which is applied to the covering or laminating film.

BRIEF DESCRIPTION OF THE DRAWINGS

FIG. 5 is a side schematic view showing the cutter assembly which may be utilized with the present invention.

FIG. 6 is yet another embodiment of the coating assembly of the present invention where coating is applied to the top of the material being fed and being shown in side schematic view.

FIGS. 8, 8a and 8b show alternate embodiments for the coating and pressure cylinder assemblies of the present invention.

DESCRIPTION OF THE PREFERRED EMBODIMENT

Figure 1:
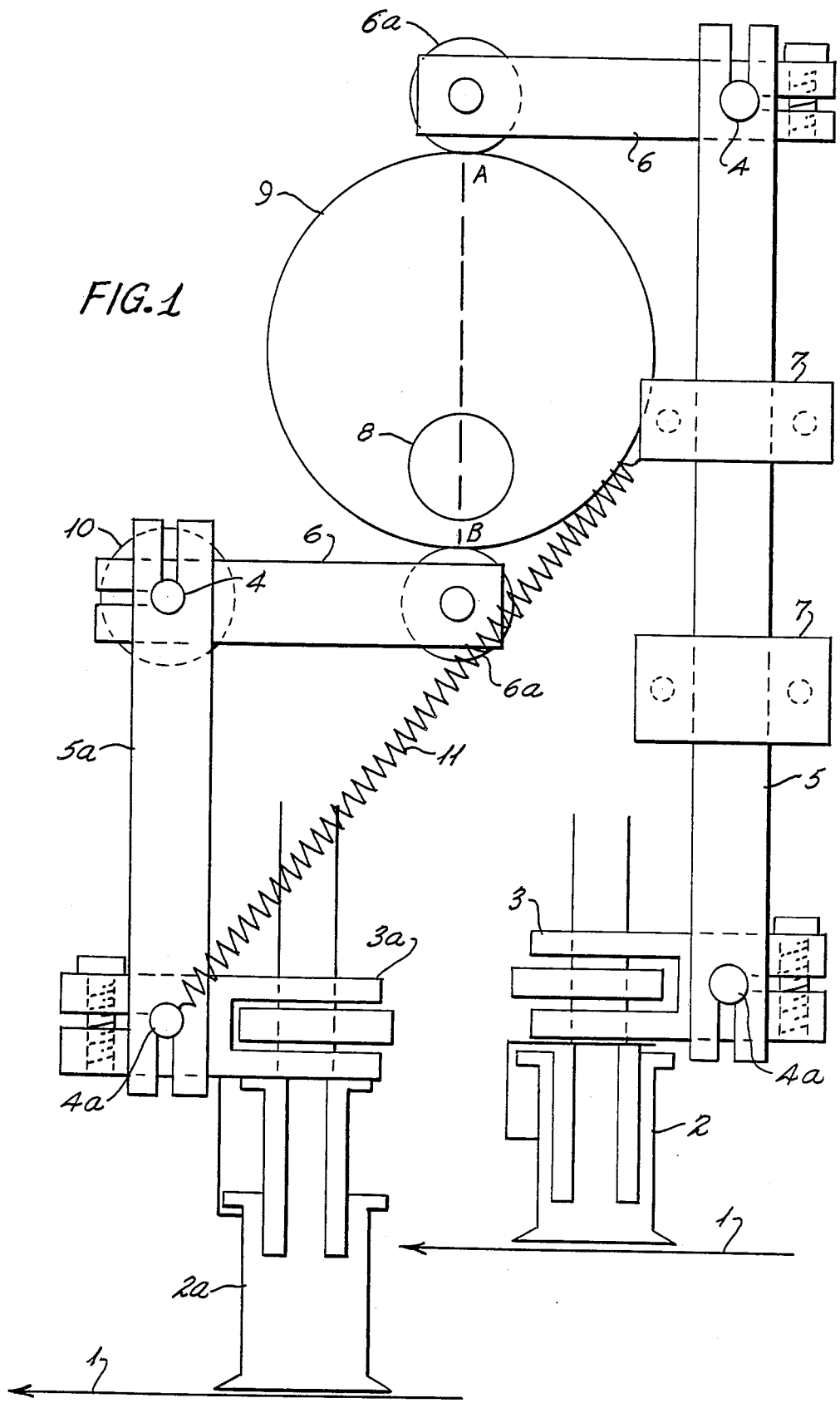
FIG. 1 is a schematic view illustrating the sheet feeding mechanism of the present invention taken in side view.

With particular reference to FIG. 1 of the drawings, it can be seen that the sheet feeding mechanism of the present invention includes a cam unit 9 having an upper portion A and a lower portion B mounted about a central axis shown at 8 which is supported by ball bearing elements (not shown). The cam revolves about the axis 8 and thereby engages and moves a pair of linkage members 6 which are spaced on either side thereof in an up and down reciprocating motion. Each of the linkages 6 includes an outer roller or ball element 6a which engages the surface of the cam as it rotates. Each linkage 6 is secured at it innermost end to an axis or pin member 4 which connects the linkages to main oscillating frames 5. It should be noted that the oscillating frame 5 associated with the upper linkage 6 is elongated with respect to the frame member 5a associated with the lower linkage 6. A pair of support blocks 3 are mounted to the lowermost portion of the frame members 5 and 5a and are connected thereto by pin members 4a in such a manner that the support blocks 3 may be angularly adjusted with respect to the frame members 5 and 5a. A pair of suction cups 2 and 2a are mounted to the support blocks 3 and 3a, respectively, and are oriented towards stacks of sheet material 1. Ball or roller bearings 10 may be provided between the frame members 5a and linkage 6 associated with the feed assemblies. The frame members 5 are further supported and guided by slide members 7 so as to be maintained in proper alignment with respect to the cam unit 9 of the feed mechanism. The two reciprocating frame members of the feed mechanism are united so that the suction cups 2 and 2a are moved alternately so as to urge or push sheet material from the stacks in the direction of the arrows shown in FIG. 1 into the coating apparatus as shown in FIGS. 2, 3, 4, 6 and 7.

Figure 9A:
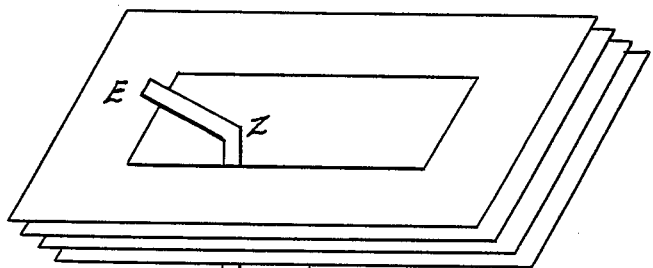
FIGS. 9a and 9b are schematic illustrational view showing guides utilized to positively feed sheet materials having openings therein to the coating apparatus of the present invention.
Figure 9B:
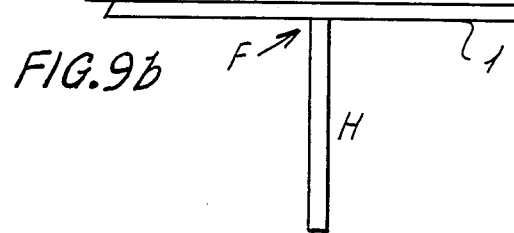

When the sheet material or carton sheets to be plasticized or coated are large and include openings, the sheets are often not flat or may become distorted due to exposure to moisture so that when the sheets are fed, the area surrounding the openings in the sheets may catch on adjacent materials. With particular reference to FIGS. 9a and 9b of he drawings, the present invention is provided with a specific feed guide member F. The feed guide member is disposed through openings (not shown) in support tables. The tables on which the sheet materials 1 are supported prior to being engaged by the suction cups carried by the feed mechanisms include openings or holes. The guide bars F extend through the openings and include a vertically extending shank portion H and tapered upwardly extending portion E which are interconnected by a joint portion Z. The joint portion Z forms an obtuse angle as shown in FIGS. 9a and 9b. Due to the orientation of the upper portion E of the guide member F, the sheet material 1 will ride up along the guide member from point Z to point E thereby elevating the sheet material with respect to the underlying materials and effectively preventing a folling or frictionalized engagement between the sheets as the upper sheet is lifted by the suction members of the feed mechanism.

In this manner, as the sheet is moving forward as shown in FIG. 9b, the back side of the opening is not engaged with the front side of an opening of the lower sheet because the material is being elevated along the portion of the guide member from Z to E. Further, the level of the feed guide F may be continuously adjusted relative to the support table so that the elevation of the feed guide remains substantially constant throughout the feeding of the sheet materials 1 from the vertical stack or array. As an alternative, air may be utilized to create a positive force to drive the sheet materials into vertically separated relationship with respect to one another with the air blast being directed from vertically below the uppermost sheet in the stack or array.

The feed assembly therefore simplifies and regulates the feeding of sheet material from the vertical array of sheets to the coating assemblies of the present invention. Further, the guide member F insures that the sheet material will not misfeed even when openings are provided in the material regardless of the speed of the feed mechanism.

Figure 2:
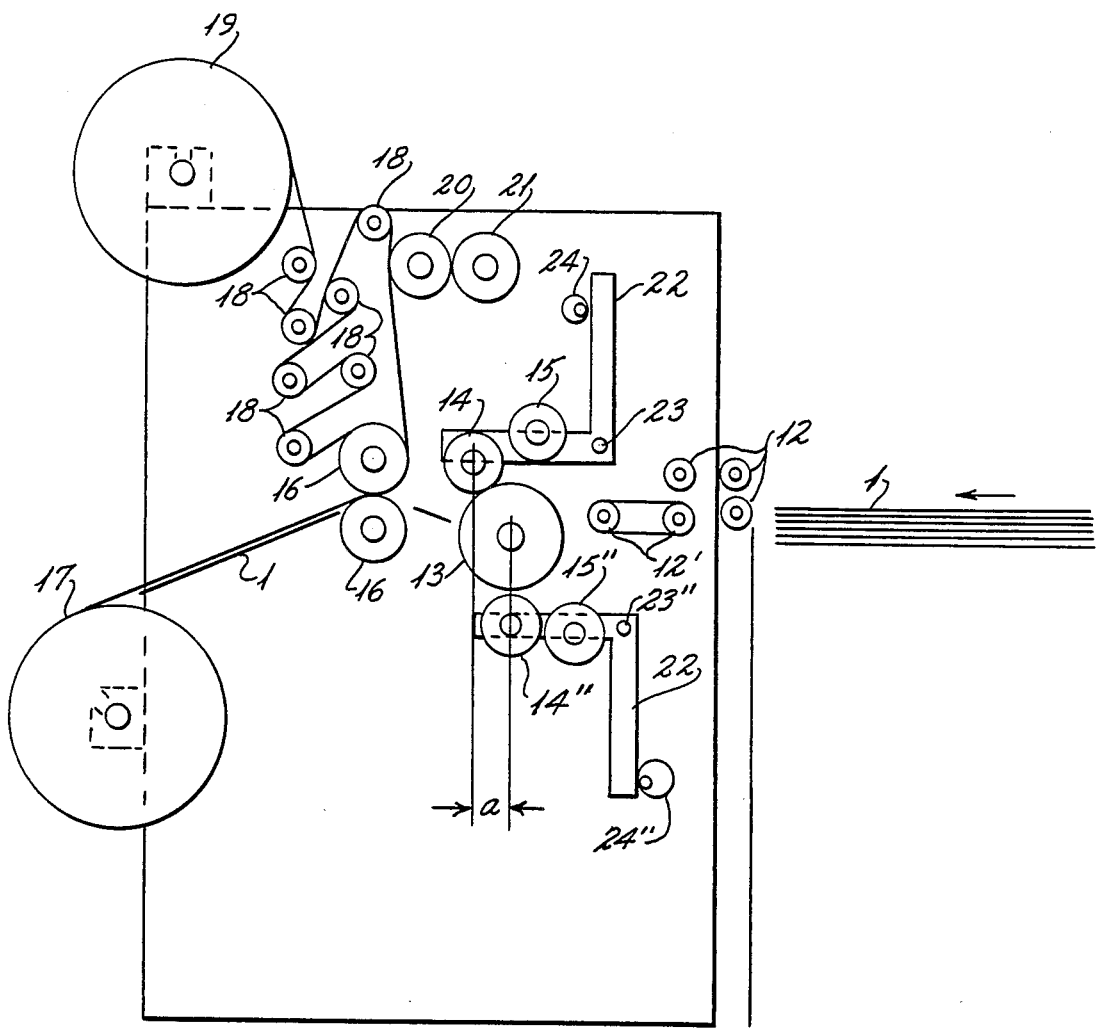
FIG. 2 is a schematic side illustrational view of the coating and film laminating portion of the present apparatus.

With particular reference to FIG. 2, one of the most important features of the present invention will be discussed in greater detail. In FIG. 2 and also as shown in FIG. 6, the present invention includes a primary sheet conveyor or transport 12 which receives the sheet material being fed from the feed mechanism shown in FIG. 1 and passes the sheet material toward a pressure cylinder 13 and coating cylinder 14 which are mounted in close proximity to one another downstream from the transport assembly. The transport assembly includes pairs of rolls and a conveyor belt 12'. The coating cylinder and the pressure cylinder are mounted so that the coating cylinder is horizontally spaced with respect to a vertical plane extending through the central axis of the pressure roller or cylinder 13. The difference in the horizontal spacing is shown by dimension "a" between the axis of the coating cylinder 14 and the pressure cylinder or drum 13. The distance between the two cylinders may vary from 0 to 15 centimeters with the coating cylinder being spaced either to the left or right of the vertical plane passing through the axis of the pressure cylinder 13. In addition, the pressure cylinder may be spaced either above or below the coating cylinder 14 but is generally slightly spaced therefrom so that the surfaces thereof are not in contact with one another.

Due to the offset spacing of the coating and pressure cylinders, when the sheet material 1 strikes or engages the coating cylinder 14, the material is forced to curve relative to the pressure cylinder 13 thereby causing pressure to be applied in an offset manner with respect to the cylinders so that the cylinder 14 is not directly pressing in axial alignment with the cylinder 13 during the period of time in which coating material is applied to the sheet material. In this manner, the coating which is applied to either thin or thick sheets of perforated or nonperforated sheet materials is applied evenly without contaminating the pressure cylinder 13 with the coating material from the coating cylinder 14.

The coating cylinder 14 is mounted adjacent a material quantity regulating cylinder 15 and both are carried by a pivotable elbow support frame 22 which is pivoted on a support pin 23. The frame 22 is engaged adjacent its upper end by an adjustable cam 24 which cam may be utilized to selectively adjust the spacing between the coating roller 14 and the pressure cylinder 13. Although not specifically shown, the frame 22 may be adjusted by movement about the pivot pin 23 so as to regulate the spacing "a" of the axis of the coating cylinder with the axis of the pressure cylinder. By way of the present invention, the mounting elbow for the coating cylinder and material quantity regulating cylinder is adjustable to permit sheet materials of different thicknesses to pass between the coating cylinder 14 and the pressure cylinder 13.

After the sheet material has passed between the coating cylinder 14 and pressure cylinder 13, the material is fed to opposing pressure cylinders 16 wherein the material may be guided either to an added oven for appropriate drying or may be laminated in a process step as to be explained in greater detail hereinbelow. Alternatively, the sheet material may be fed from the opposing pressure cylinders 16 to an appropriate cutting mechanism following a lamination process as will be described hereinafter. With regard to FIG. 5, the elements of the cutting mechanism are shown in greater detail with the finished products being deposited as shown on a collection receptacle 26.

When the sheet material is being coated with a glue as opposed to being varnished, once the material reaches the pair of opposing pressure rollers 16, the material is met with rolled film 19 which is pressed against the sheet material after which the laminated material is immediately wound on roll 17 while the roll is running at any convenient speed. To facilitate the adhesion of the rolled film 19 with the sheet materials 1, air blasts may be forced against the back side of the film in the area between the opposing pressure rollers 16 and the collection roller 17. Having passed around the roller 17, the material may thereafter be introduced into a cutter assembly as shown in FIG. 5.

Figure 4:
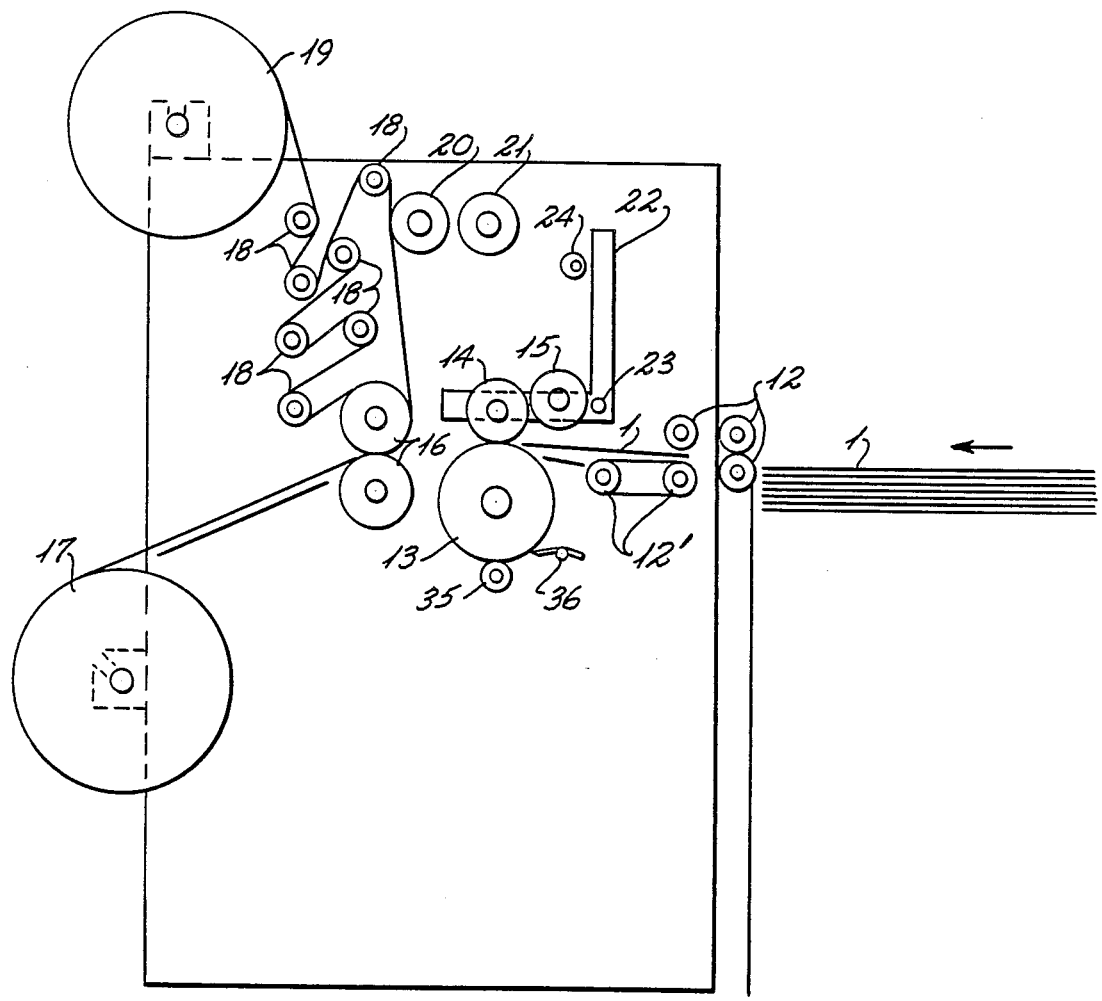
FIG. 4 is a side schematic view of yet another embodiment of coating assembly utilized with the present invention.
Figure 7:
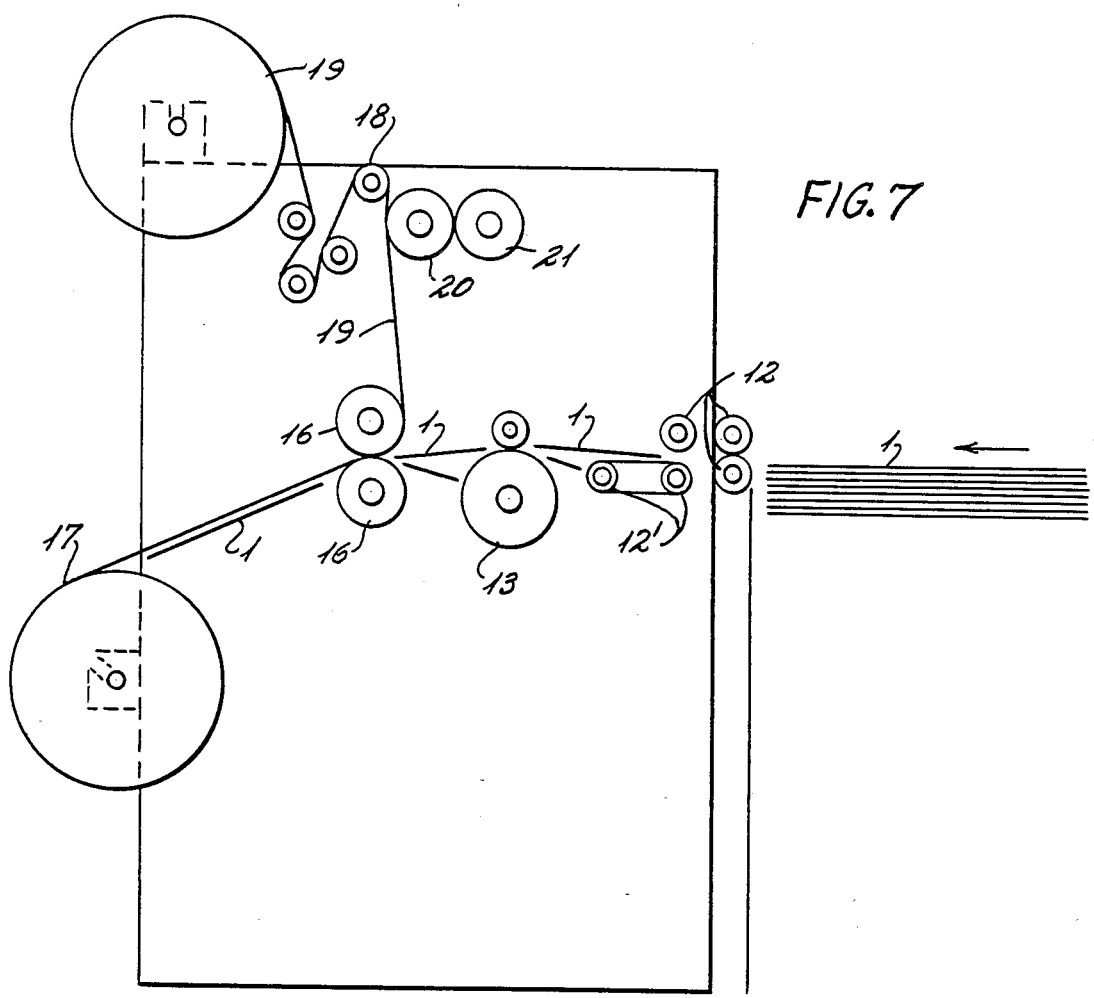
FIG. 7 is a further embodiment of the coating assembly of the present invention shown in side schematic view.

With continued reference to FIGS. 2, 4 and 7 of the drawings, the coating of a plastic transparent film roll 19 is disclosed in greater detail. As shown in these figures, the film 19 on the roll passes through a series of stretching cylinders 18 and the film is coated on the outside by a coating cylinder 20. The amount of coating glue is regulated by a glue regulating cylinder 21 which is mounted adjacent the coating cylinder 20. The glue regulating cylinder is mounted immediately upstream of the pressure cylinder 16 so that the glue is applied just prior to entering the pressure cylinders 16. In the pressure cylinders 16, the plastic film is laminated or joined to the incoming material sheets 1 which have been introduced through the feed rolls and belts 12 and passed through the coating cylinder 14 and pressure cylinder 13. In pressure cylinders 16, the materials are pressed together and thereafter rolled on roller element 17.

A particular advantage of the present structure and method is that the film from the coating cylinder 20 passes through a very short distance before entering the pressure cylinders 16. In this manner, the glue does not dry prior to the film being laminated to the sheet materials. Therefore, the glue spreads evenly between the film and the sheet materials thereby insuring a uniform bond. Because of the foregoing method, the quantity of glue needed to laminate the film to the underlying sheet material is reduced due to the flowable characteristics of the glue at the point at which contact is made between the film and the underlying sheet material. Also, because of the flowable nature of the glue at the point of contact between the film and the sheet material, the apparatus of the present invention may be operated at considerably higher speeds thereby increasing production.

The present invention is designed to permit variation or differences in the coating of the materials passing through the apparatus. More specifically, the machine may be utilized to either coat the upper, lower or both the upper and lower surfaces of the sheet material as material passes between the coating rollers and pressure rollers.

With particular attention to FIGS. 8, 8a and 8b, it is shown that the coating cylinder 14 may be mounted separately or apart from the mounting frame 22 such as shown in FIG. 2 and thereby be freely revolving and not being regulated by the movement of the frame. In these embodiments, the material regulating cylinders 15 may be spaced at various points adjacent the coating roller 14. In FIG. 8, a single material regulating roller is placed adjacent the side of the coating roller 15. In FIG. 8a, a pair of regulating rollers 15 and 15a are placed above the coating roller 14 with the contact being made between the coating roller 14 and secondary regulating roller 15a. Both the rollers 15 and 15a are mounted to the pivotable frame 22 In FIG. 8b, a third material regulating roller 15b is disposed below the roller 15a so as to be intermediate the 17. Roller 15a and coating roller 14. In addition, in the embodiment shown in FIG. 8, 8a and 8b, the pressure rollers 13 may be mounted on a frame assembly 22' which is pivotable about a mounting pin 23' and adjustable utilizing a cam 24'. In this manner, the pressure regulating roller may be suitably adjusted relative to the coating roller 14. In this manner, the pressure roller 13 may be automatically regulated to accept sheet material at varying thicknesses.

In order to supply coating material to both sides of the sheet materials 1 as they pass adjacent the pressure roller 13, a second coating assembly may be mounted beneath the pressure roller 13. As shown in FIG. 2, the second assembly includes a coating roller 14'', a regulating roller 15'', both of which are mounted to an elbow or pivotable frame 22''. The frame 22'' is adjustable about pivot 23'' and is regulated by an adjustable cam 24'' so as to regulate the spacing of the second coating roller 14'' with respect to the pressure roller 13.

Figure 3:
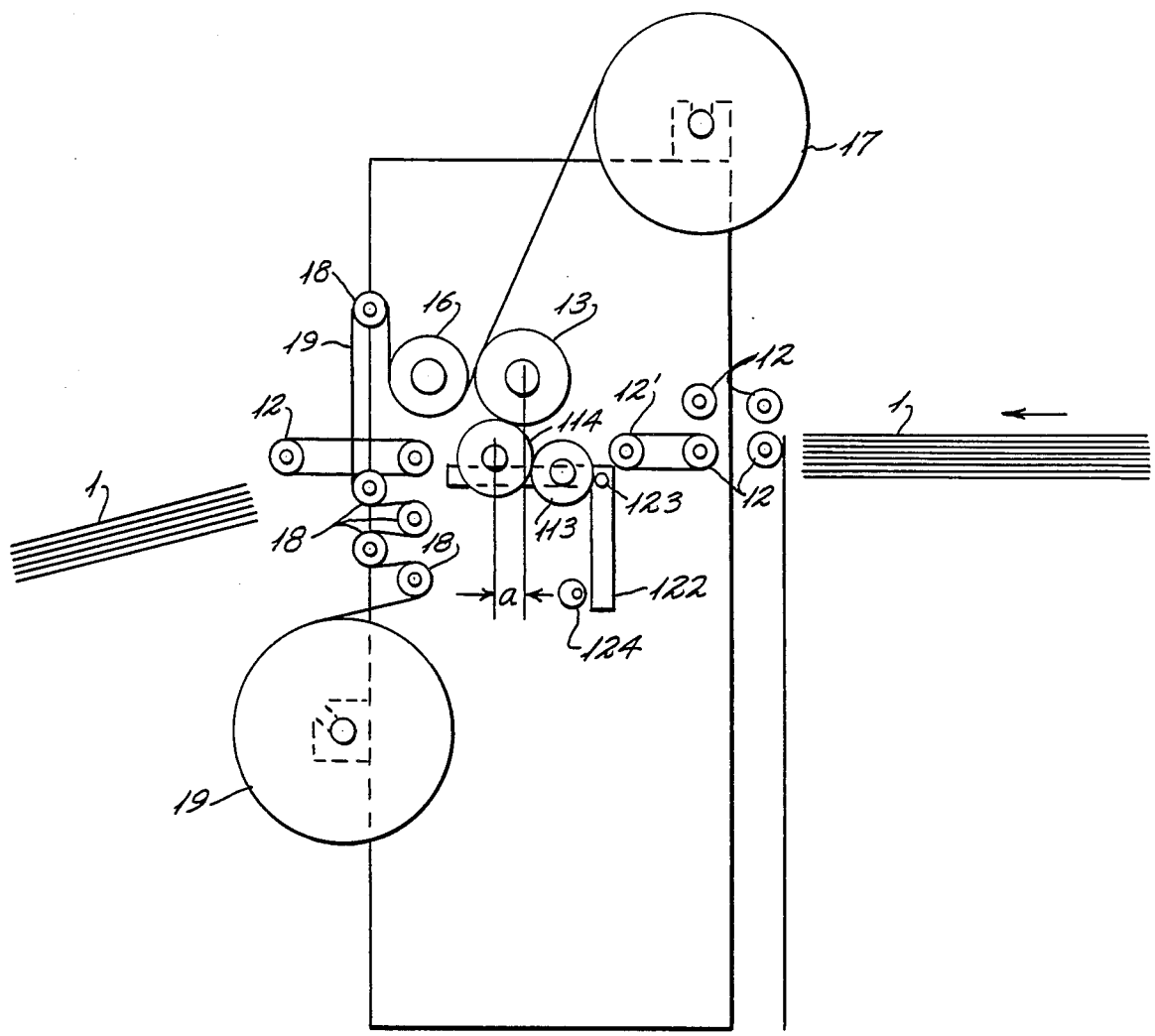
FIG. 3 is a side schematic view of another embodiment of coating assembly utilized with the present invention.

With specific reference to FIG. 3 of the drawings, an embodiment of the invention is disclosed wherein only the bottom portion of the sheet material is coated. In this embodiment, the upper coating roller 14 has been replaced by a lower coating roller 114 which is mounted to an elbow frame 122. A regulating roller 113 is mounted adjacent to the lower coating roller 114. The frame or elbow 122 is mounted about a pivot 123 and is adjustable utilizing a cam member 124. The cam member permits the lower coating roller 14 to be adjustable with respect to the pressure roller or cylinder 13. In this embodiment, only the lower portion of the sheet material 1 is coated with the coating material as the material passes between the lower coating roller 114 and the pressure cylinder or roller 13. As with the prior embodiments, the axis of the lower coating roller 114 is offset horizontally with respect to the axis of the pressure cylinder 13 thereby obtaining the same advantages as discussed above with respect to the previous embodiments. The apparatus of FIG. 3 coats the sheet material on the back or lower sides and is mainly used for coating cartons with heat melting wax materials. Also, this embodiment may be utilized for plasticizing on perforated or nonperforated sheets wherein the sheets are to be laminated to film 19 after passing relative to the coating cylinder 114.

In the embodiment of FIG. 3, once the sheet material has passed the lower coating roller 114, the material is guided upwardly by the pressure roller 16 which is opposing the pressure cylinder 13. In this embodiment, once the film 19 is contacted with the lower surface of the sheet material, the two are bonded and thereafter carried into collection cylinder 17.

In FIG. 4 of the drawings, a further embodiment of the present invention is disclosed in greater detail. In this embodiment, the coating roller 14 is mounted above the pressure cylinder 13 and in general axial alignment therewith. Due to this alignment of the roller 14 with the pressure cylinder 13, it is necessary to provide an apparatus for removing coating materials and glues from the pressure cylinder. In this embodiment, the pressure cylinder is continuously cleaned by providing a revolving brush 35 which contacts the pressure cylinder remote from the coating roller or cylinder 14. A proper cleaning liquid may be applied by the brush 35. Adjacent to the brush is a scraper 36 which scrapes and keeps the cleaning liquid free of passing toward the coating roller 14. The remaining elements of the apparatus of FIG. 4 are similar to those of the previous embodiment discussed with regard to FIGS. 2 and 6.

As opposed to the pressure cylinder 13 shown in FIGS. 2, 3, 6, 8, 8a and 8b, a flat surface or curved surface may be properly formed adjacent the coating roller so as to provide the appropriate pressurized contact of the sheet material relative to the coating cylinder. Further, as opposed to using regulating cylinders such as shown at 15, various regulating blades or other scrapers may be provided so as to limit the coating of material on the coating cylinders 14.

A further embodiment is disclosed in FIG. 6 of the drawings wherein the coating rollers 20 shown in FIG.

2 have been removed so that the plastic film is adhered directly to the coating applied to the sheet material passing between the coating roller 14 and the pressure cylinder or roller 13. In FIG. 7, another modified structure which includes the film coating roller 20 and regulating roller 21 is disclosed. In this embodiment, the coating roller 14 is not in use and the only coating of materials is provided by coating the film as it passes by coating roller 20. The sheet material 1 enters through the feed rolls 12 and passes the pressure roller or cylinder 13 and between the pressure roller 16 where the sheets are laminated with the film 19 which has been treated with adhesives or other coatings as it passes in proximity to coating roller 20.

With respect to FIGS. 2, 3 and 4, there is a housing which may be connected for a portable drying oven when the system is operated to varnish the materials passing therethrough and which drying unit is removed when the unit is operated as plasticizer or when a cutting element is necessary. With regard to the cutting element, specific reference is made to FIG. 5 of the drawings. When the plasticized sheets are fed from the collector roller 17, they are introduced through a pair of cylinders 27 and introduced to two cutting blades 29 and 30. The upper blade is fitted together on parallel bars 32 which move up and down by the operation of pistons and thereby create a cutting movement for the present apparatus.

The sheets which are stuck together or united in spaced relationship with the plastic film as is designated at 17 in FIG. 5 approach the area of photocell 28. The photocell detects the space between the sheet materials adhered to the plastic film. Afterwards, the photocell operates the cutter in a timed sequence and commands the piston 31 to operate to drive the cutting knife 29 and cutting blade 30. Once the sheets have been cut, they are collected in a collection tray 26. At 33, a thin pliable blade is provided, with or without springs, and has one end at a lower level than the knife edge 29. The blade 33 is supported on the same bars 32 with the cutting knife 29. The blade 33 stabilizes the material as the cutting knife is lowered to effectuate each cut and in this manner allows a perfect cut to be made in less than a second. Associated with the cylinder pairs 27 are special devices which synchronize the pulling cylinders 27 so as to prevent one side from being pulled relative to the other.

In the coating device of the present invention, the automatic feeding of material and the continuous recycling of coating materials is of great importance. It is also desirous of having a machine which operates in such a manner that it is not necessary to occupy a person to inspect the supply bowl which normally houses the coating material during operation of the machine.

The recycling of the material both increases the quality of the product and reduces the cost of manufacture. Further, recycling of the materials relative to the supply bowls continuously stirs the liquid coating thereby preventing it from thickening in the bowl or becoming watery and separating to the top of the bowl as the machine is in operation.

The automatic feeding and continuous recycling of coating material is accomplished by the use of two suction pumps with the first pump introducing material from the supply bowl through a rubber pipe and into the area between the coating cylinders 14 and material regulating cylinders 15 which are moving in a reverse rotation with respect to one another. In this manner, the coating material remains in between these two cylinders and after the sheet material passes relative to the coating cylinders, the remaining material is allowed to flow into a lower bowl. A second pump is provided at the lower bowl so as to continuously circulate and recycle the coating material from the lower bowl to the main collection bowl. The lower pump conveys materials through a rubber pipe from the lower bowl to the main collection bowl or barrel where it is conveyed through a second rubber pipe and valved fitting which is mounted through one side of the main bowl which valve has two outlets and a main inlet. The inlet is connected with the outlet of the second pump by way of the rubber pipe while one outlet of the valve is connected to a rubber pipe which is extended into the main collection barrel while the second outlet of the valve communicates into the main bowl directly. The supply through the valve between the barrel and the primary bowl may be regulated by providing a proper float mechanism which will move according to the material level in the bowl so that the levels within the bowls supplying coating materials between the coating rollers and regulating rollers is maintained at a substantially continuous level thereby insuring uniformity of coating of the coating rollers or cylinders at all times.

I claim:

1. An apparatus for coating and laminating sheet materials where the materials are fed from a sheet material supply and collected as a completed product comprising sheet feed means, said sheet feed means including first and second sheet engaging means mounted in generally parallel relationship with respect to one another, first cam means for reciprocally driving said sheet engaging means with respect to the sheet material supply, conveyor means mounted adjacent said sheet feed means, at least one coating cylinder means spaced from said conveyor means for receiving sheet means from said conveyor means, means for supplying coating materials to said coating cylinder means, a pressure cylinder means mounted adjacent to said coating cylinder means, means for adjusting the spacing between said pressure cylinder means and said coating cylinder means, laminating means spaced from said coating cylinder means, said laminating means including a supply of film material, at least one second pressure cylinder means, said film extending from said film supply beyond said second pressure cylinder means to a collection means, whereby sheet materials passing between said coating cylinder means and said pressure cylinder means are introduced adjacent to said second pressure cylinder means into contact with said film material and thereafter collected on said collection means.

2. The apparatus of claim 1 in which said means for collecting said film and said sheet means includes a cutter means, said cutter means including at least one cutting blade, control means for reciprocating said cutting blade at intervals so as to sever said film at areas between each of said sheet means, and collection tray means mounted adjacent said cutter means.

3. The apparatus of claim 1 including brush means mounted adjacent said pressure cylinder means and scraper means mounted adjacent said brush means and in engagement with said pressure cylinder means whereby said brush means and said scraper means continuously clean said pressure cylinder means.

4. The apparatus of claim 1 in which said means to adjust the spacing between said coating cylinder means and said first pressure cylinder means includes a pivotable frame means, said pressure cylinder means being mounted to said pivotable frame means, and cam means for adjusting the position of said pivotable frame means.

5. The apparatus of claim 4 including spreader cylinder means mounted adjacent said first coating cylinder means, said spreader cylinder means being mounted upon a pivotable frame means so as to be adjustable with respect to said coating cylinder means, and means for adjusting the position of said pivotable frame means.

6. The apparatus of claim 1 in which said sheet feed means includes a guide means extending vertically with respect to said sheet means, said guide means including an angulated upper portion extending upwardly and toward said conveyor means whereby said sheet materials are elevated as they are moved toward said conveyor means by said sheet engaging means.

7. The apparatus of claim 6 in which said sheet engaging means are driven by a rotating cam mounted therebetween.

8. The apparatus of claim 1 in which said coating cylinder means are mounted on a first axis and said pressure cylinder means are mounted on a second axis, said first and second axes being horizontally spaced with respect to one another so that pressure applied to the sheet material passing therebetween is applied in non-axial relationship between said coating cylinder means and said pressure cylinder means.

9. The apparatus of claim 8 in which said means to adjust said spacing between said coating cylinder means and said pressure cylinder means includes a first frame means, said coating cylinder means being mounted to said first frame means, means for pivotally mounting said first frame means relative to said pressure cylinder, and cam means for adjusting said first frame means relative to said first pressure cylinder means.

10. The apparatus of claim 9 including a coating material regulator roller mounted adjacent said coating cylinder means, and means for supplying coating materials intermediate said coating cylinder means and said regulator roller means.

11. The apparatus of claim 10 including a second coating cylinder means mounted in spaced relationship from said first coating cylinder means and adjacent to said pressure cylinder means, a second pivotable frame means, said second coating cylinder means being mounted to said second frame means, means for pivotally mounting said second frame means relative to said pressure cylinder means and means for adjusting said second frame means with respect to said pressure cylinder means.

12. The apparatus of claim 11 including a third coating cylinder means spaced adjacent said second pressure cylinder means for supplying coating materials to said film material as said film material passes toward said second pressure cylinder means.

13. The apparatus of claim 12 in which said second pressure cylinder means includes a pair of spaced cylinder means which are closely spaced with respect to one another so as to receive said sheet material and said film in compressed relationship therebetween.

* * * * *